(12) United States Patent
Gupta et al.

(10) Patent No.: US 11,461,510 B2
(45) Date of Patent: Oct. 4, 2022

(54) GENERATION SYSTEM AND METHOD (71) Applicant: Myntra Designs Private Limited, Bangalore (IN)

(72) Inventors: Akanksha Gupta, Uttar Pradesh (IN); Vishnu Vardhan Makkapati, Karnataka (IN); Vikram Garg, Rajasthan (IN)

(73) Assignee: Myntra Designs Private Limited, Bangalore (IN)

( * ) Notice: Subject to any disclaimer, the term of this patent is extended or adjusted under 35 U.S.C. 154(b) by 758 days.

(21) Appl. No.: 16/165,643

(22) Filed: Oct. 19, 2018

(65) Prior Publication Data

US 2019/0347364 A1 Nov. 14, 2019

(30) Foreign Application Priority Data

May 8, 2018 (IN) .............................. 201841017207

(51) Int. Cl.
| | |
|---|---|
| G06F 17/50 | (2006.01) |
| G06F 30/00 | (2020.01) |
| A41H 43/00 | (2006.01) |
| G06F 113/12 | (2020.01) |
| G06F 119/18 | (2020.01) |

(52) U.S. Cl.
CPC ............. *G06F 30/00* (2020.01); *A41H 43/00* (2013.01); *G06F 2113/12* (2020.01); *G06F 2119/18* (2020.01)

(58) Field of Classification Search
CPC ......... G06F 9/54; G06F 30/00; G06F 2113/12
USPC ........................................................ 719/310
See application file for complete search history.

(56) References Cited

U.S. PATENT DOCUMENTS

| | | | | |
|---|---|---|---|---|
| 5,388,050 A | * | 2/1995 | Inoue ..................... | D04B 37/02 700/131 |
| 5,408,595 A | * | 4/1995 | Tajima .................. | G06T 11/001 345/549 |
| 6,665,095 B1 | * | 12/2003 | Janssen ...................... | B41J 2/01 358/2.1 |
| 8,165,711 B2 | * | 4/2012 | Brooking ................ | G06F 30/00 700/132 |
| 9,639,969 B1 | * | 5/2017 | Wilson .................... | H04L 51/32 |
| 2006/0072818 A1 | * | 4/2006 | Herley ...................... | G06T 7/12 382/173 |

(Continued)

OTHER PUBLICATIONS

Michael Barclift, CAD-Integrated Cost Estimation and Build Orientation Optimization to Support Design for Metal Additive Manufacturing. (Year: 2017).*

(Continued)

*Primary Examiner* — Lechi Truong
(74) *Attorney, Agent, or Firm* — IceMiller LLP (57) ABSTRACT

A design system for creating a new design by combining two or more input designs is provided. The design system comprises a design selection module configured to select two or more input designs based on a plurality of parameters. The design system further comprises a design computing module coupled to the design selection module and configured to compute one or more number design elements for each input design and compute a plurality of split points for each design elements. The design system further includes a design generation module configured to selectively combine design elements from different input designs to generate a new design.

15 Claims, 5 Drawing Sheets

(56) References Cited

U.S. PATENT DOCUMENTS

| | | | |
|---|---|---|---|
| 2010/0107129 A1* | 4/2010 | Gerowitz | G06F 30/327 |
| | | | 716/136 |
| 2012/0317524 A1* | 12/2012 | Taoka | G03F 1/70 |
| | | | 716/53 |
| 2016/0041957 A1* | 2/2016 | Finsterwald | G06Q 10/10 |
| | | | 715/202 |
| 2016/0069003 A1* | 3/2016 | Molnar | D03C 19/005 |
| | | | 700/140 |
| 2017/0354164 A1* | 12/2017 | Sauvageau | A23G 1/50 |
| 2019/0008226 A1* | 1/2019 | Krivonosova | A41H 3/007 |
| 2019/0147120 A1* | 5/2019 | Benjamin | G06Q 50/165 |
| | | | 703/1 |

OTHER PUBLICATIONS

Lingrui Dai, The Application of 3D Digital Technology to Fashion Design. (Year: 2008).*

1 Jiangxi Institute, The role of computer aided design in fashion design teaching exploration. (Year: 2016).*

* cited by examiner

GENERATION SYSTEM AND METHOD

PRIORITY STATEMENT

The present application claims priority under 35 U.S.C. § 119 to Indian patent application number 201841017207 filed 8 May, 2018, the entire contents of which are hereby incorporated herein by reference.

BACKGROUND

The present invention generally relates to automated designing systems and more particularly to a system and method for generating new designs by optimizing existing designs.

Garment design is a key function in the garment manufacturing industry. Garments are typically designed based on a trend in the industry, a season or a local or global event (like Christmas, Diwali and other such events). While designing garments, a designer typically has an idea of various possible combinations of designs and creates a new one based on various existing elements. In some cases, new elements are also added to an existing design. Designers typically analyze possible combinations by manually combining various design elements and further making modifications as needed to create new designs. However, because of the manual nature of work, manufactures generally are not able to scale the new designs to existing designs.

In recent times, some designing techniques use computer software for creating garment designs. However, most designing software require design related inputs from a fashion designer. Fashion designers typically observe trending styles or world fashion to create their own designs. However, designing garments is a time consuming and knowledge intensive task. Typically, it takes a designer several hours to create a real or virtual layout of new garment design by combining or modifying existing designs.

In addition, designers may not generally come up with optimized or possible combinations of suitable mix and match of the design elements and changes as needed to create new ones. Designer may be able to specify certain aspects or attributes of their envisioned garment to guide the garment manufacturer in generating a new design. However, the new design will require multiple iterations and exchanges between the designer and the manufacturer before a final design is created in large quantities for distribution to market or sales outlets.

Therefore, there is a need for an automated and computationally efficient design system to create new designs of the fashion garments by optimizing existing designs.

SUMMARY

The following summary is illustrative only and is not intended to be in any way limiting. In addition to the illustrative aspects, example embodiments, and features described, further aspects, example embodiments, and features will become apparent by reference to the drawings and the following detailed description. Example embodiments provide system and method for size and fit personalization at user profile level.

Briefly, according to one embodiment of the present technique, a design system for creating a new design by combining two or more input designs is provided. The design system comprises a design selection module configured to select two or more input designs based on a plurality of parameters. The design system further comprises a design computing module coupled to the design selection module and configured to compute one or more number of design elements for each input design and compute a plurality of split points for each design elements. The design system further includes a design generation module configured to selectively combine design elements from different input designs to generate a new design.

In another embodiment, a method for creating a new design by combining two or more input designs is provided. The method comprises selecting two or more input designs based on a plurality of parameters, computing one or more number of design elements for each input design and computing a plurality of split points for each design elements. The method further includes scaling plurality of design elements to a common reference size and selectively combining design elements from different input designs to generate a new design.

BRIEF DESCRIPTION OF THE FIGURES

These and other features, aspects, and advantages of the example embodiments will become better understood when the following detailed description is read with reference to the accompanying drawings in which like characters represent like parts throughout the drawings, wherein:

FIG. 3-A an example illustration of various design elements in an example apparel, according to aspects of the present technique;

FIG. 3-B is an example representation of various design points with each design elements, according to aspects of the present technique;

FIGS. 4-A and 4-B is an example representation of two existing designs which are used to generate a new design, according to aspects of the present technique;

DETAILED DESCRIPTION OF EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in many alternate forms and should not be construed as limited to only the example embodiments set forth herein.

Accordingly, while example embodiments are capable of various modifications and alternative forms, example embodiments are shown by way of example in the drawings and will herein be described in detail. It should be understood, however, that there is no intent to limit example embodiments to the particular forms disclosed. On the contrary, example embodiments are to cover all modifications, equivalents, and alternatives thereof. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. Inventive concepts may, however, be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the scope of inventive concepts.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular example embodiments only and is not intended to be limiting. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in 'addition to the orientation depicted in the figures. For example, if the device in the figures is turned over, elements described as "below" or "beneath" other elements or features would then be oriented "above" the other elements or features. Thus, term such as "below" may encompass both an orientation of above and below. The device may be otherwise oriented (rotated 90 degrees or at other orientations) and the spatially relative descriptors used herein are interpreted accordingly.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Figure 1:
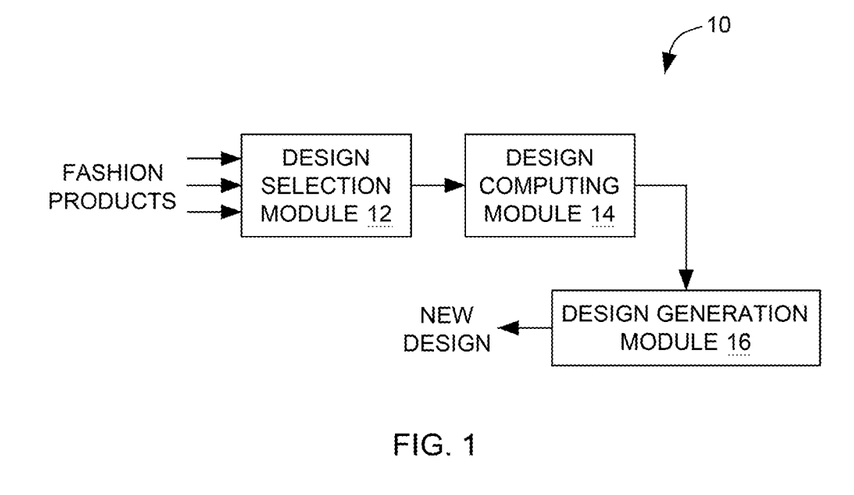
FIG. 1 is a block diagram of one embodiment of a design system for creating new designs, implemented according to an example embodiment.

At least one example embodiment is generally directed to a design system and techniques for creating new designs from existing trending styles. The design system 10 includes a design selection module 12, a design computing module 14 and a design generation module 16. The manner in which the design system 10 operates is described in further detail below. For the purpose of this description, the following embodiments are described with respect to an online fashion retail platform. However, it must be understood that embodiments described herein can be implemented on an e-commerce platform.

FIG. 1 is a block diagram of one embodiment of a design system implemented according to aspects of the present technique. Design system 10 includes a design selection module 12, a design computing module 14 and a design generation module 16. The design system is configured to generate new designs by combining and optimizing design elements from existing designs. Each block is described in further detail below.

Design selection module 12 is configured to receive several input designs of fashion garments. As used herein, an input design is an image representative of a fashion garment. The design selection module 12 is configured to select one or more input designs based on one or more desired parameters. In one embodiment, the parameters are provided by a fashion designer. For example, the parameters provided may include the type of garment, the style of garment, a specific design on the garment, etc. The parameters may also be selected based on a bestselling trend, a particular season, an in-fashion color, sales data of top selling designs, etc.

Design computing module 14 is configured to identify one or more design element in each input design selected by the design selection module 12. As used herein, a design element corresponds to a detail or section of the garment. For example, design elements for a tee shirt may include of sleeves, collar, body, pocket(s), colors, placket graphics, etc. Design computing module is further configured to compute a plurality of split points for each design element.

The design generation module 16 is configured to generate a new design by combining design elements of the selected designs. For example, a new design is generated by combining a first set of design elements of a first input design with a second set of design elements of a second input design. It may be noted that new designs may be generated using any number of input designs. The manner in which at least two designs are combined to create a new design is described in further detail below.

Figure 2:
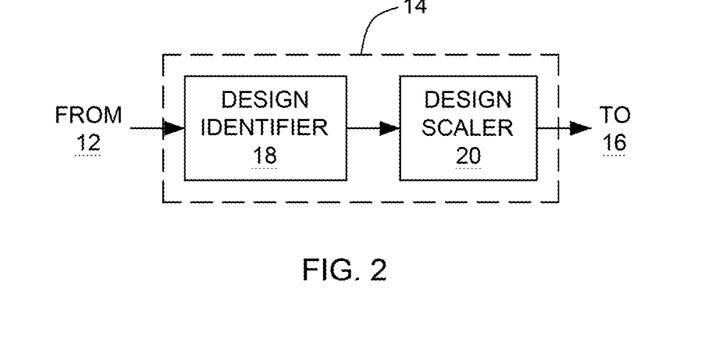
FIG. 2 is a block diagram of one embodiment of design computing module, implemented according to aspects of the present technique.

FIG. 2 is a block diagram illustrating one embodiment of a design computing module implemented according to aspects of the present technique. Design computing module 14 is configured to identify one or more design elements in each design selected by the design selection module. Design computing model is further configured to compute a plurality of split points for each design element. The design computing 14 comprises design identifier module 18 and design scaling module 20. Each block is described in further detail below.

The design identifier module 18 is configured to identify the various design elements of the input designs. In general design elements refer to various sections of garment. For example, design elements in a tee-shirt typically includes the sleeves, the collar, pockets (if any), etc. Once the design elements are identified, a plurality of split points are calculated for each design element.

Design identifier module 18 is further configured to identify one or more dominant color of the input designs. In one embodiment, the pixels corresponding to the one or more dominant colors are identified on the input designs. Thus, for an example input of two input designs, the design identifier modules generate a first design set comprising its design elements, corresponding split points and dominant colors for a first input design and a second design set comprising its design elements, corresponding split points and dominant colors for the second input design. Thus, each input design will have its own design set of design elements, split points and dominant colors.

Design scaler 20 is configured to receive the two design sets to generate a new design. Since the two input design sets may be of varying sizes, design scaler 20 is configured to scale the input designs to a common reference. Once scaled, the two input designs are combined to generate a new design. The manner in which design elements and split points are computed is described in further detail below.

Figure 3:
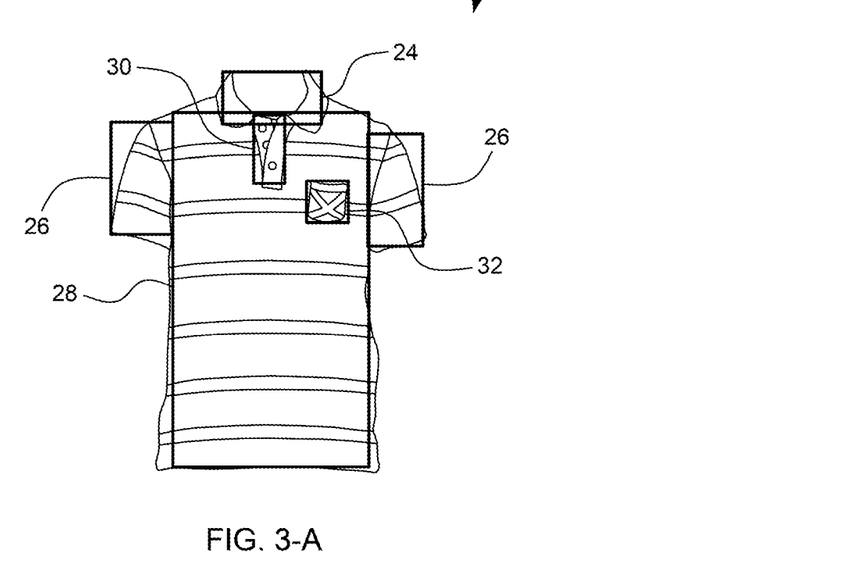

FIG. 3A is an illustration of exemplary fashion product with its design elements, implemented according to aspects of the present technique. The illustrated fashion product is a striped tee shirt 22. The tee-shirt 22 comprises a design elements 24, 26, 28, 30 and 32. As can be seen in FIG. 3A, each design element corresponds to a component of the tee-shirt like sleeves, collar, body, graphic design, etc. Split points are computed from the design elements and are illustrated in more detail in FIG. 3B.

FIG. 3B illustrates splits points on different portions of the tee shirt 22. Split points 34 and 38 are present at points where two design elements meet or overlap. For example, split point 34 is present where design elements 26 and 28 overlap (see, FIG. 2). Similarly, split point 38 is present where design element 24 and 28 overlap. The contour of the tee-shirt and the split points on the contour are calculated by various known techniques. One such technique is described in MYN005 which is incorporated by reference herein.

FIG. 4A and FIG. 4B are example input designs used for generation of a new design based on aspects of the present technique. FIG. 4A illustrates input design 40 of a tee shirt with long sleeves. FIG. 4B illustrates input design 50 of a tee shirt with short sleeves.

Input designs 40 and 50 comprises design elements of varying sizes. For example, design element 48 which corresponds to the body of tee shirt 40 is larger than design element 58. Similarly, design element 49, which corresponds to the sleeve of tee shirt 40 is longer than design element 59 of tee shirt 50.

For stitching design elements from tee-shirt 40 to tee-shirt 50, the various design elements are first scaled to a common size. For the example of a tee-shirt, the body is the largest design element and therefore the remaining design elements such as collar and sleeves, are scaled to fit the respective locations on the body 58. For example, the left (right) sleeve goes to left (right) sleeve location on the body 58 and collar goes to collar location on the body 58. The manner in which the designs are split and then a new design is generated is described in further detail below.

Figure 5:
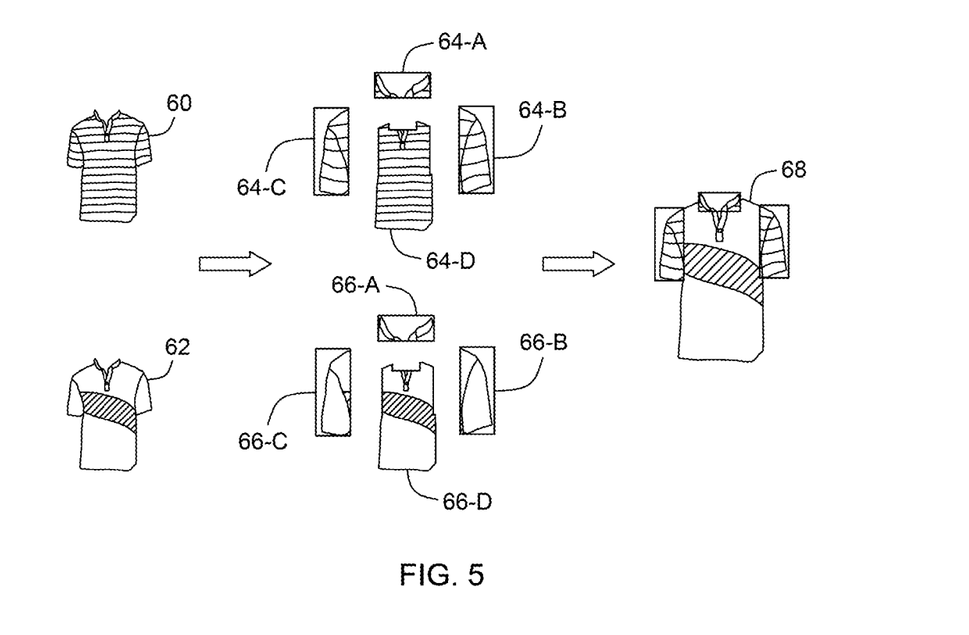
FIG. 5 is illustrating a manner in which two existing designs are split and stitched, according to aspects of the present technique.

FIG. 5 is a flow chart depicting a manner in which two example designs are combined to generate a new design. In the illustrated example, input design 60 is a striped tee-shirt. Input design 62, is a plain tee-shirt with a diagonal pattern 63. Each step is described in further detail below.

Input design 60 is split into a plurality of sub images as shown by 64-A, 64-B, 64-C and 64-D. It may be noted that sub-images are created by first calculating the split points for the input design as described in FIG. 3A and FIG. 3B. Each sub-image corresponds to a particular portion of the tee-shirt design. For example, sub-image 64-A corresponds to the collar, 64-B and 64-C correspond to the sleeves and 64-D correspond to the body of the tee-shirt.

Similarly, input design 62 is split into a plurality of sub images as shown by 66-A, 66-B, 66-C and 66-D. Each sub-image corresponds to a particular portion of the tee-shirt design. For example, sub-image 66-A corresponds to the collar, 66-B and 66-C correspond to the sleeves and 66-D correspond to the body of the tee-shirt.

New design 68 is generated by combining sub-images from both input designs. In the illustrated embodiment, the new design is generated by stitching together sub-images 64-A, 64-B, 64-C and the sub-image 66-D. In one embodiment, the minimum bounding rectangle (MBR) of the design elements in these sub-images is calculated and is used during the stitching process. The top-left and bottom-right x- and y-coordinates of the MBR are calculated as the minimum and maximum x- and y-values of those of the design elements.

Figure 4:
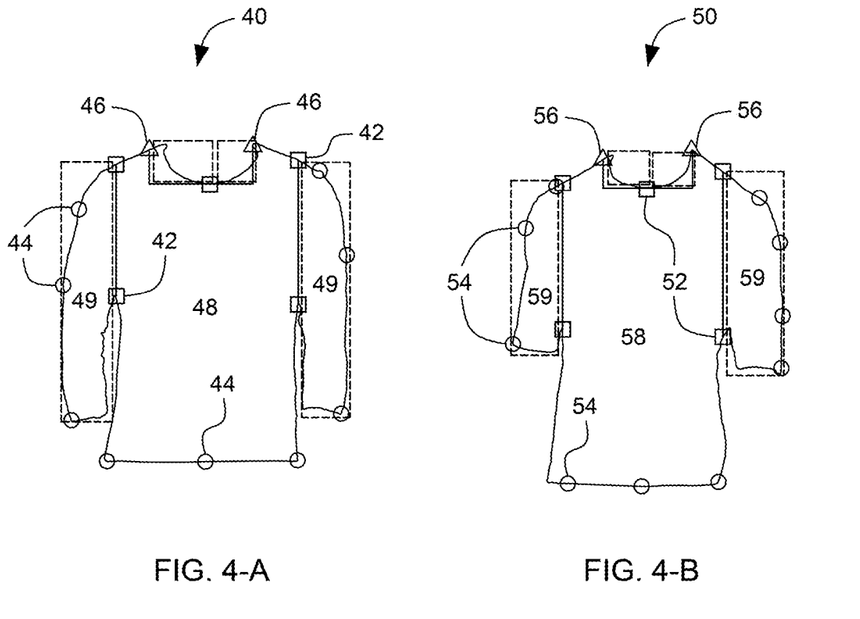

For example, the distance between split points 49 in FIG. 4-A has to be scaled to that between split points 59 in FIG. 4-B. The MBR of the left sleeve of 40 is scaled by the ratio of these distances so it can be stitched to the body of 50. In addition, the collar is scaled appropriately by splitting the corresponding MBR into two parts. In one embodiment, the MBR of the collar is split into two by using its lowest point. Similarly, the left (right) MBR of 46 is scaled to that of left (right) MBR of 56. Thus, the collar is stitched appropriately in the presence of a placket.

It may be noted that, the size of the two input designs and their design elements may be different in terms of the number of pixels. Therefore, all design elements are aligned to a common size for the purpose of stitching. Also, in the illustrated example, the design element corresponding to the body of the tee-shirt 62 is the largest design element, the remaining design elements 64-A, 64-B, 64-C are scaled to fit the body 66-D appropriately. In some embodiments, graphic elements are added to the new design. The manner in which graphic designs are added to a new design is described in further detail below.

Figure 6:
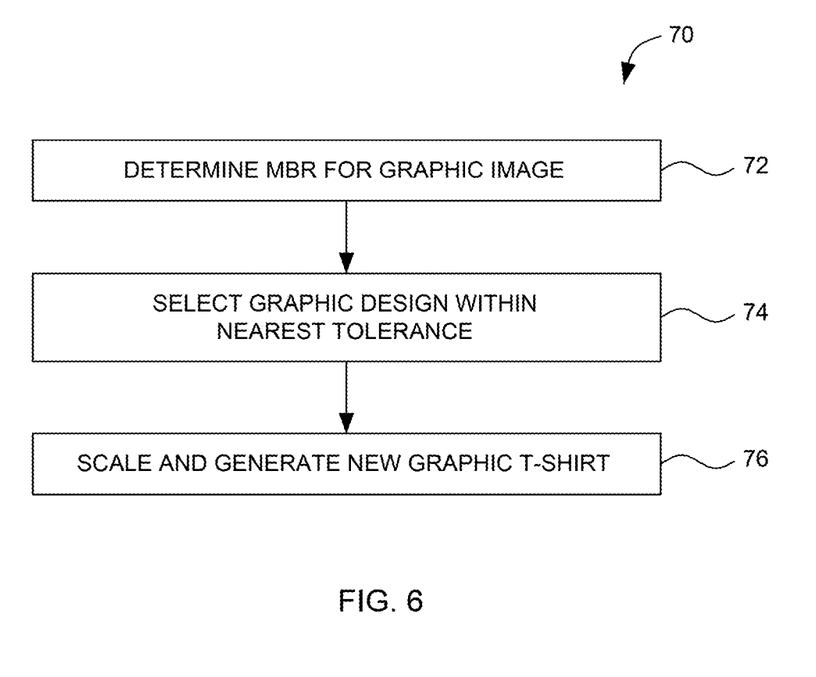
FIG. 6 is a flow chart illustrating the steps for including a graphic element in a new design, implemented according to aspects of the present technique.

FIG. 6 is a flow chart illustrating one method by which a graphic element is added to a new design according to aspects of the present technique. In the technique described below, graphic elements are described with reference to tee shirts. However it should be understood that the techniques described herein may be applied to any kind of fashion product. Each step of the process is described in further detail below.

At step 72, a minimum bounding rectangle (MBR) for a graphic element is determined. In one embodiment, an aspect ratio of the graphic element is computed. Graphic elements with similar aspect ratio is searched in a library.

At step 74, the graphic design within the nearest tolerance is selected. In one embodiment, the graphic design is also selected based on matching color components.

At step 76, the selected graphic design is scaled to the size of the original graphic on the tee-shirt and a new design is generated. By using the techniques described above, one or more graphic design elements may also be included in the new design. In one embodiment, all graphic design elements are stored in a graphic library. The library includes graphics of various sizes and color. In a further embodiment, the graphics stored in the library are based on their aspect ratio. While generating new designs, searches may be performed based on the aspect ratio to find graphic design elements within a certain tolerance range. A combination of new designs may be then generated as shown in FIG. 7.

Figure 7:
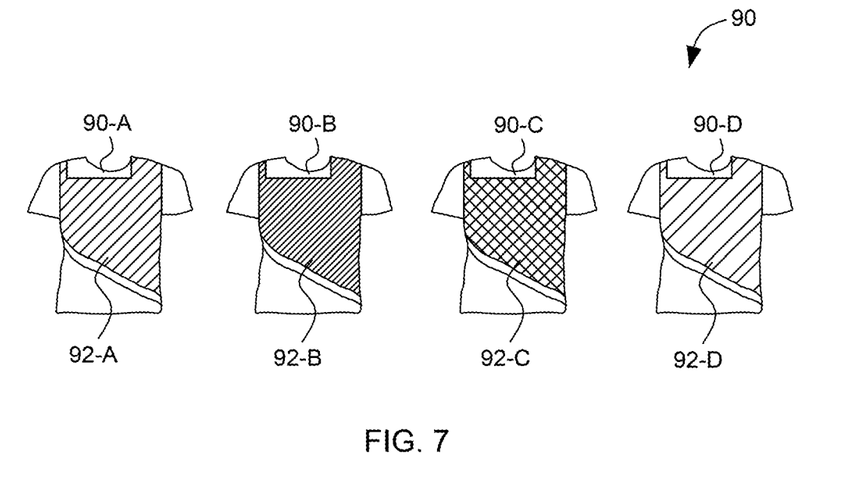
FIG. 7 is an example representation of generating graphic elements for new designs, implemented according aspects of the present technique.

FIG. 7 illustrates four different fashion products 90-A, 90-B, 90-C and 90-D. Although the garment is the same, various graphic design elements 92-A, 92-B, 92-C and 92-D have been added in each design to generate a new product. The graphic elements are chosen from a library and scaled and matched to fit the new design.

In some cases, the new designs that are obtained by stitching together two or more input designs, may have color combinations that are less appealing than others. In such instances, the new designs are created to match a dominant color of all the design elements of the fashion product. For the example of a tee shirt, the dominant color will correspond to the core region of the design element corresponding to the body.

The present techniques may also be applied to change a pattern on a fashion product. As described with reference to graphic designs, a library is created comprising multiple patterns. For example, the stripes on a given t-shirt can be changed with another pattern selected from a library of patterns. In order to change the pattern, the t-shirt is first split into its design elements namely, body, sleeves and collar. The pattern of the t-shirt is then determined along with its specific parameters such as colour, thickness, repeat size, etc. The pattern on the t-shirt is replaced with a pattern with the similar repeat size. In addition, a dominant color of the collar is replaced with the dominant colour of the selected pattern.

The body and sleeve components are filled with the selected pattern, for example, stripes, by stretching it horizontally or vertically depending on whether the stripe is a horizontal or vertical one. The pattern is repeated till the entire body or sleeve are filled. If the sleeve is rotated, the design element is first rotated to make it parallel to the pattern and then filled and rotated back to its original position.

In addition, the stripes of the t-shirt can be stretched or skewed to change the size of the repeat pattern. Also, the colors may be replaced with trending colors to generate new patterns that are different from those on the input t-shirt. In general, the patterns are generally classified into auto (large), feeder (small) and engineered. The auto stripes are shrunk while the feeder stripes can be expanded. The engineered ones can either be shrunk or expanded. Thus, a new pattern t-shirt is designed by retaining the core design of the input t-shirt.

It may be noted that the modules of the system 10 described herein are implemented in computing devices. One example of a computing device 100 is described below in FIG. 8. The computing device 120 includes one or more processor 122, one or more computer-readable RAMs 124 and one or more computer-readable ROMs 126 on one or more buses 128. Further, computing device 120 includes a tangible storage device 130 that may be used to execute operating systems 140 and the design system 10. The various modules of a design system 10 include a design selection module 12, a design computing module 14 and a design generation module 16. Both, the operating system 120 and the system 10 are executed by processor 102 via one or more respective RAMs 104 (which typically include cache memory). The execution of the operating system 120 and/or the system 10 by the processor 122, configures the processor 122 as a special purpose processor configured to carry out the functionalities of the operation system 120 and/or system 10, as described above.

Figure 8:
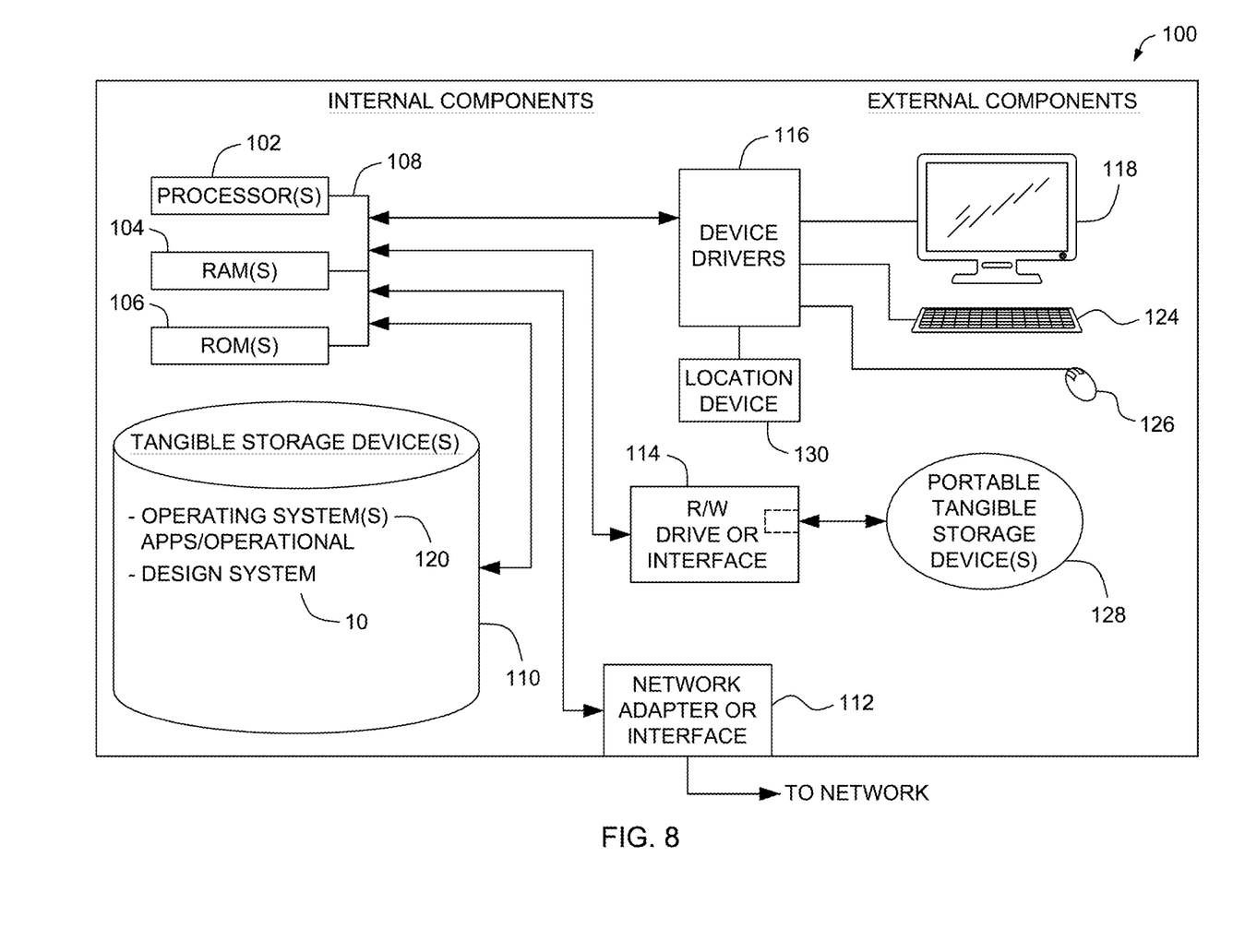
FIG. 8 is a block diagram of an embodiment of a computing device in which the modules of the system, described herein, are implemented.

Examples of storage devices 130 include semiconductor storage devices such as ROM 126, EPROM, flash memory or any other computer-readable tangible storage device that may store a computer program and digital information.

Computing device also includes a R/W drive or interface 134 to read from and write to one or more portable computer-readable tangible storage devices 130 such as a CD-ROM, DVD, memory stick or semiconductor storage device. Further, network adapters or interfaces 132 such as a TCP/IP adapter cards, wireless Wi-Fi interface cards, or 3G or 4G wireless interface cards or other wired or wireless communication links are also included in computing device.

In one example embodiment, data related to the system 10, may be stored in tangible storage device 130 and may be downloaded from an external computer via a network (for example, the Internet, a local area network or other, wide area network) and network adapter or interface 132.

Computing device further includes device drivers 136 to interface with input and output devices. The input and output devices may include a computer display monitor 138, a keyboard 144, a keypad, a touch screen, a computer mouse 146, and/or some other suitable input device.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

While only certain features of several embodiments have been illustrated, and described herein, many modifications and changes will occur to those skilled in the art. It is, therefore, to be understood that the appended claims are intended to cover all such modifications and changes as fall within the true spirit of inventive concepts.

The aforementioned description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the example embodiments is described above as having certain features, any one or more of those features described with respect to any example embodiment of the disclosure may be implemented in and/or combined with features of any of the other embodiments, even if that combination is not explicitly described. In other words, the described example embodiments are not mutually exclusive, and permutations of one or more example embodiments with one another remain within the scope of this disclosure.

The invention claimed is:

1. A design system for creating a new design by combining two or more input fashion garment designs, the design system comprising: a design selection unit configured to select two or more input fashion designs respectively of two or more garments based on one or more parameters, the two or more input fashion designs being different from one another, wherein the two or more garments are different from one another; a design computing unit coupled to the design selection unit and configured to: compute one or more design elements for each of the input fashion garment designs; and compute a plurality of split points for each of the one or more computed design elements; and a design generation unit configured to (i) match a dominant color of all of the computed design elements and (ii) combine all of the computed design elements to generate a new design;

wherein the design computing unit further comprises: a design identifier configured to compute the one or more design elements; and a design scaler configured to scale a plurality of design elements to a common reference size;

wherein the design computing unit is configured to compute the one or more design elements using a minimum bounding rectangle.

2. The system of claim 1, wherein the design identifier is configured to identify a dominant color of each of the input fashion garment designs.

3. The system of claim 1, wherein, for each of the input fashion garment designs, the design computing unit stores a design set comprising corresponding design elements and a dominant color.

4. The system of claim 1, wherein the design computing module unit is configured to: select a graphic design element from a graphic element library; and stitch the graphic design element to generate the new design.

5. The system of claim 4, wherein the design computing unit is configured to match the selected graphic design element to the dominant color.

6. The system of claim 5, wherein the design generation unit is configured to select and scale a plurality of graphic design elements to generate a corresponding plurality of new designs.

7. The system of claim 4, wherein the graphic design elements are scaled to a fixed aspect ratio while storing in the graphic design library, and wherein the graphic design elements are stored in a searchable format.

8. The system of claim 1, wherein the design computing unit is configured to select a pattern from a pattern library and match the pattern to the respective input design to generate the new design.

9. The system of claim 1, wherein each of the input fashion garment designs is selected based on at least one of a type of a garment, a style of the garment, and a specific design on the garment.

10. A method for creating a new design by combining two or more input designs, the method comprising: selecting two or more input fashion designs respectively of two or more garments based on one or more parameters, the two or more input fashion garment designs being different from one another, wherein the two or more garments are different from one another; computing one or more design elements for each of the input fashion garment designs; computing a plurality of split points for each of the one or more computed design elements; matching a dominant color of all of the computed design elements, scaling the computed design elements to a common reference size by a design identifier; and combining the one or more computed design elements from the input fashion garment designs to generate a new design and computing the one or more design elements using a minimum bounding rectangle.

11. The method of claim 10, wherein each of the one or more design elements is computed using a minimum bounding rectangle.

12. The method of claim 10, further comprising identifying a dominant color for each of the input fashion garment designs.

13. The method of claim 12, further comprising storing a design set for each of the input fashion garment designs, wherein the design set comprises corresponding design elements and a dominant color.

14. The method of claim 10, further comprising: selecting a graphic design element from a graphic element library; matching the selected graphic design element to the dominant color; and stitching the graphic design element to generate the new design.

15. The method of claim 10, wherein each of the input fashion garment designs is selected based on at least one of a type of a garment, a style of the garment, and a specific design on the garment.

\* \* \* \* \*